June 19, 1934.  D. L. HAY  1,963,087
PHASING OF ISOCHRONOUS MECHANISMS
Filed Jan. 15, 1932

INVENTOR
DONALD L. HAY
BY
ATTORNEY

Patented June 19, 1934

1,963,087

UNITED STATES PATENT OFFICE 1,963,087

PHASING OF ISOCHRONOUS MECHANISMS

Donald L. Hay, Washington, D. C.

Application January 15, 1932, Serial No. 586,910

16 Claims. (Cl. 172—293)

(Granted under the act of March 3, 1883, as amended April 30, 1928; 370 O. G. 757)

This invention relates to means for maintaining isochronous mechanisms in phase, or for restoring the proper phase relation if they are caused to get out of phase by some casual occurrence.

The object of my invention is to provide a simple and effective means to bring again into the desired phase relation one of a plurality of isochronous devices that is out of phase with the remainder thereof by automatically increasing the angle of lag until the phases again coincide.

With the above and other objects in view, the invention consists in the construction, combination and arrangement of parts as will be described more fully hereinafter.

The shafts of two similar self-starting isochronous motors, which it may be desired to maintain in a definite angular relation to each other, will, after reaching normal speed, continue to rotate at identical speeds and will remain indefinitely in the same relative angular positions with respect to each other as long as the power is not interrupted. If the power to one of the motors be interrupted for a short interval, the motor will slow down and may even stop, but will immediately regain its normal speed after the power is again applied. Since the speed of the other motor has remained unchanged, the phase angle of the motor that slowed down will lag behind that of the motor that continued at normal speed.

Figure 1:
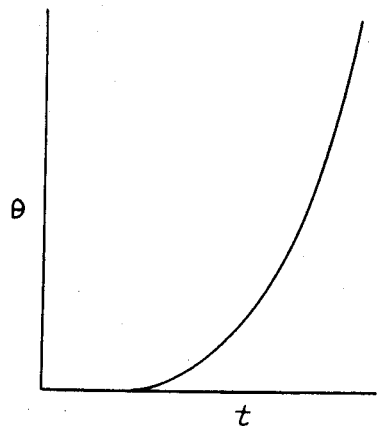
Fig. 1 is a graph showing the relation between the time of interruption of power flow to an isochronous device and the angle of lag produced thereby.

If the power circuit to the motor that slowed down be periodically interrupted, the phase angle lag thereof may be made to increase step by step until the phases are again coincident. It has been found by experiment that the angular lag is not proportional to the time of interruption of the power, but varies approximately as shown in the graph of Fig. 1. From this it is seen that for short interruptions the lag is extremely small, but as the interruption interval grows longer the increment of lag is proportionately much greater than the increment of time. Hence, if a mechanism is arranged to open the power circuit of the lagging motor periodically for intervals proportional to the angle of lag, the approach to synchronism between the motors will be rapid while the angle of lag is large, but will become slower as the two come more nearly into phase, as seen from Fig. 1 wherein the angles of phase difference $\theta$ are shown as ordinates and the time is shown as abscissæ. The present invention provides means for so interrupting the power to the lagging motor.

Figure 2:
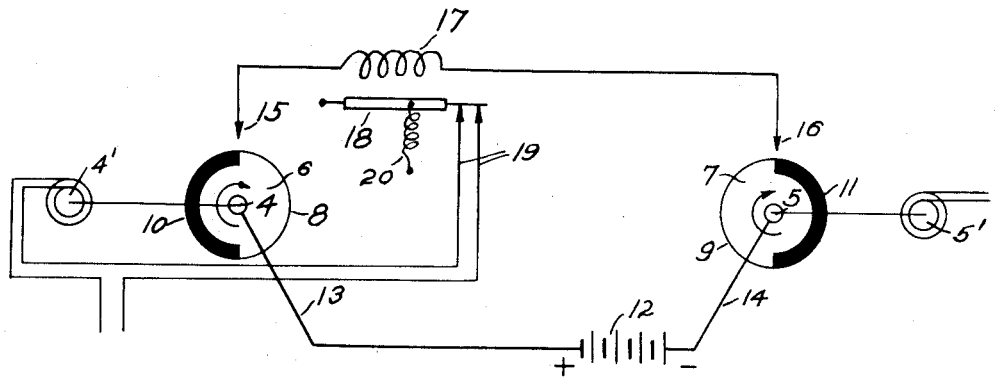
Fig. 2 is a diagrammatic representation of one application of my invention.

In Fig. 2 the shafts 4 and 5 of two isochronous motors 4' and 5' carry the commutator disks 6 and 7, respectively, which have respectively the conducting portions 8 and 9 and the insulating portions 10 and 11 on their peripheries. Conducting portions 8 and 9 are connected to battery 12 through their respective shafts and the wires 13 and 14.

In normal operating relation, the conducting portions 8 and 9 are 180° out of phase with each other, and brushes 15 and 16 are so adjusted that brush 15 is passing from conducting segment 8 to insulating segment 10 at the instant that brush 16 is passing from insulating segment 11 to conducting segment 9, hence, there is no flow of current from battery 12 through the circuit connecting the brushes.

Included in the circuit between brushes 15 and 16 is the winding 17 of an electromagnet that is disposed to actuate, when energized by flow of current therethrough, the armature 18 of a relay that controls the flow of power through wires 19 to the motor 4' on shaft 4. A spring 20 holds the armature normally to keep the circuit through wires 19 closed and maintain the uniform rate of rotation of the motor on shaft 4.

If, however, the motor 4' gets out of phase with the motor 5', the brushes 15 and 16 will be simultaneously in contact with their respective conducting segments, the circuit through winding 17 and battery 12 will be closed and current will flow through the winding, which will energize the winding and draw armature 18 away from the contacts of wires 19. The time interval of flow of current through winding 17 will be exactly proportional to the angle of phase difference between the two motors and the lag of the motor 4' will be increased, the exact increment of lag accruing thereto being defined by the relations shown on the curve in Fig. 1. The lag will thus increase with each revolution of shaft 4 until the two motors are again in phase, after which time the circuit through wires 19 will remain closed and the two motors will rotate in unison.

Since the time of interruption of the circuit through wires 19 is short when the angle of phase difference is small, the increment of lag is insignificant and a relatively long time is required to get the motors again in synchronism. The arrangement shown in Fig. 3 accomplishes the desired result much more expeditiously than does the device described.

Figure 3:
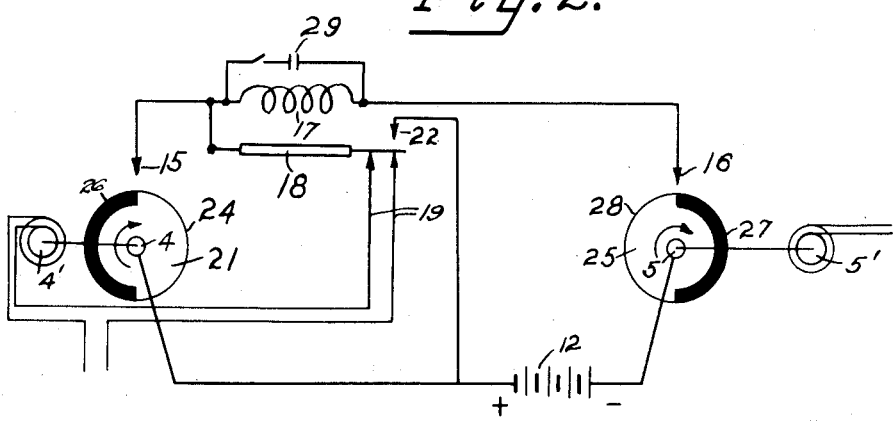
Fig. 3 is a diagrammatic representation of a form of my invention that brings the out-of-phase device into phase more quickly than does the arrangement shown in Fig. 2. For purpose of illustration, two shafts rotating at the same rate are shown but my invention is applicable to any number of shafts in which the rotational rates of the faster shafts are whole multiples of the rate of the slowest.

The general system in Fig. 3 is similar to that in Fig. 2, but is modified in certain respects. The armature 18 is electrically connected to that terminal of winding 17 adjacent commutator 21, and a contact 22 that is connected to the positive terminal of battery 12 is disposed to contact the armature when the armature is drawn away from wires 19 by winding 17. When the armature is drawn against contact 22, current continues to flow through winding 17 so long as brush 16 is in contact with conducting segment 23, thus greatly prolonging the duration of the interruption of the circuit through wires 19 and very materially increasing the lag of the motor 4', as will be seen from a consideration of the curve in Fig. 1. In fact, the circuit through wires 19 will remain open until commutators 21 and 25 have rotated to place both of brushes 15 and 16 in contact with the insulating segments 26 and 27, when the flow of current through winding 17 will be stopped and armature 18 will move back to its contact with the wires 19. This makes the time required for phasing angles greater than 90° practically the same as that for 90°, instead of many times greater. In actual practice it is impossible to obtain absolutely perfect synchronism and a maximum limit of permissible phase difference must be set. For example, in a particular instrument it may be necessary that the shafts be in synchronism within the limits $\pm \frac{1}{8}°$. To obtain this result the angular extent of both of the contact segments 24 and 28 are not made exactly 180°, the latter being somewhat less, say 179¾°, thus leaving ¼° within which the commutators may be out of phase without operating the synchronizing relay; if the relay were actuated when there is but a minute phase difference—within the limits of tolerance—it would tend to increase the lag and result in greater phase difference.

Since the lag introduced by a short interruption is shown by Fig. 1 to be very small, it is desirable that any interruption should be not appreciably less than the time required for the shaft to rotate ¼°, and some sort of delay-action should be used. This may be accomplished by shunting a condenser 29 across the relay winding 17 or by a mechanical device acting on armature 18 that will prevent closing of the circuit in less than the specified time.

If the above described device is applied to two motors whereof the shafts rotate at a rate of one revolution per second, they can be brought into synchronism within ⅓° in a time of five to six seconds.

The invention described herein may be manufactured and used by or for the Government of the United States of America for governmental purposes without the payment of any royalties thereon.

I claim:

1. In combination, a pair of isochronously rotatable shafts, a commutator on one of said shafts having one part of its periphery of electrically conducting material and the other part of insulating material, a second commutator on the other of said shafts having on its periphery insulating material extending over one part of the periphery increased by an angle substantially twice the angle of permissible phase difference between said shafts, the said conducting portions being 180° different in phase when said shafts are in phase, brushes so disposed that one contacts the periphery of each of said commutators and always at least one of said brushes is in contact with an insulating segment when said shafts are synchronized, a relay winding connected between said brushes, an armature actuable by said winding electrically connected between said winding and the brush on said first commutator, driving means for said commutators, a power circuit for the driving means of one of said commutators controlled by said armature, a source of current connected to said commutators, a contact disposed and connected to close a circuit through said source, said armature, said winding and said second commutator when said power circuit is opened, and a capacity connectible across said winding.

2. In combination, a pair of isochronously rotatable shafts, a commutator on one of said shafts having one part of its periphery of electrically conducting material and the other part of insulating material, a second commutator on the other of said shafts having on its periphery insulating material extending over one part its periphery increased by an angle substantially twice the angle of permissible phase difference between said shafts, said conducting portions being 180° different in phase when the said shafts are in phase, brushes so disposed that one contacts the periphery of each of said commtuators and always at least one of said brushes is in contact with an insulating segment when said shafts are in phase, driving means for said commutators, a power circuit for the driving means of one of said commutators, connecting means between said brushes, means to cause a current to flow between said brushes when said brushes are simultaneously in contact with said conducting segments, and means operable by such current to open said circuit while said brushes are so in contact with said conducting segments and for a fixed interval thereafter.

3. In combination, a pair of isochronously rotatable shafts, a commutator on one of said shafts having one part of its periphery of electrically conducting material and the other part of insulating material, a second commutator on the other of said shafts having on its periphery insulating material extending over one part its periphery increased by an angle substantially twice the angle of permissible phase difference between said shafts, said conducting portions being 180° different in phase when said shafts are in phase, brushes so disposed that one contacts the periphery of each of said commutators and always at least one of said brushes is in contact with an insulating segment when said shafts are in phase, driving means for said commutators, a power circuit for the driving means of one of said commutators, connecting means between said brushes, means to cause a current to flow between said brushes when said brushes are simultaneously in contact with said conducting segments, and means operable by such current to open said circuit while said brushes are so in contact with said conducting segments.

4. In combination, a pair of isochronously rotatable shafts, a commutator on one of said shafts having on its periphery equal segments of insulating and of conducting material, a second commutator on the other of said shafts having segments of insulating and of conducting material on its periphery, the extent of said insulating material being slightly in excess of that of the conducting material, brushes connected together and disposed to contact said commutators and to bear upon segments of unlike material when said shafts are synchronized, means to cause current to flow between said brushes when said brushes are simultaneously in contact with conducting segments, driving means for said commutators, a power circuit for the driving means of one of said commutators, and means operable by such flow of current to open said circuit while said brushes are so in contact with said conducting segments.

5. A method of bringing a plurality of isochronous motors operating at different points on a common power source into a predetermined phase relationship, comprising periodically interrupting the power circuit to at least one of said motors during a part of a cycle period that is a function of the phase difference and is always greater than that corresponding to the then existing angle of phase variation from said relationship until said relationship is established.

6. A method of bringing a plurality of isochonous motors operating on a common power source into a predetermined phase relationship, comprising periodically automatically interrupting the power circuit to at least one of said motors during a part of a cycle period that is a function of the phase difference and is always greater than that corresponding to the then existing angle of phase variation from said relationship until said relationship is established.

7. A member of bringing a plurality of isochronous motors operating on a common power source into a predetermined phase relationship, comprising imparting to at least one of said motors successive increments of lag during parts of a cycle period that are a function of the phase difference and are always greater than that corresponding to the then existing phase difference until the said relationship is established.

8. In combination, a pair of shafts rotating at speeds such that the speed of one is substantially an exact multiple of the speed of the other, a commutator on each of said shafts, each of said commutators having on its periphery a conducting segment and an insulating segment, a brush contacting each of said commutators, the extent and disposition of the said several segments being such that when said shafts are rotating in their proper relationship the brush bearing on the slower commutator will pass over the conducting segment thereon simultaneously with the passage of the brush contacting the faster commutator over the insulating segment thereof, operating means for said commutators, a power circuit for the operating means of one of said shafts, and means operatively connected to said brushes to interrupt said power circuit when the above specified relations between the brushes and segments of the commutators do not obtain.

9. In combination, isochronously rotating shafts, means operated from the same source of power to drive said shafts, a power circuit for one of said driving means and means controlled by the phase of rotation relation existing between said shafts to open said circuit when said shafts are out of phase and hold said circuit open during a part of a phase period greater than that corresponding to the then existing angle of phase difference.

10. In combination, a pair of isochronously rotatable shafts, a commutator on each of said shafts, each of said commutators having segments of conducting and insulation material on its periphery, a brush contacting each commutator, a power circuit for the driving means of one of said commutators and means operatively connected to said commutators to interrupt said power circuit when said shafts are out of phase and maintain such interruption so long as the brush on the other commutator continuously contacts a conducting segment.

11. In combination, isochronously rotatable shafts, a commutator on each shaft, each of said commutators having segments of conducting and insulating material on its periphery, driving means for said shafts, a power circuit for one of said driving means, a source of current connected to said commutators, a brush contacting each commutator, means including a coil connected to said brushes, an armature disposed to close the circuit through the said driving means for one shaft and disposed to be moved by said coil to open said circuit and a contact element disposed to close a circuit through said source, the other commutator and said coil when said armature is moved by said coil to open the first mentioned circuit whereby the first mentioned circuit is kept open so long as the brush on said other commutator continuously contacts a conducting segment.

12. In combination, isochronously rotatable shafts, means operated from the same source of power to drive said shafts, a power circuit for one of said driving means, means controlled by the phase of rotation relation existing between said shafts to open said circuit when said shafts are out of phase and means to keep said circuit open for a time greater than the phase difference.

13. In combination, a pair of isochronously rotatable shafts, a commutator on each of said shafts, each of said commutators having segments of conducting and insulating material on its periphery, a power circuit for the driving means of one of said commutators and means operatively connected to said commutators to interrupt said power circuit, when said shafts are out of phase, for a period substantially greater than the phase difference between them.

14. In combination, a pair of isochronously rotatable shafts, a commutator on each of said shafts, each of said commutators having segments of conducting and of insulating material on its periphery, means to drive said commutators, a power circuit for the driving means of one of said commutators, a circuit that includes said commutators but is separate from the power circuit of said driving means of said commutators, and means operated by current through said commutators to interrupt the power circuit of the driving means for one of said commutators when said shafts are out of phase for a period substantially proportional to the phase difference between them.

15. A method of bringing a plurality of isochronous motors operating at different points on a common power circuit into a predetermined phase relationship, comprising periodically interrupting the power circuit to at least one of said motors during a part of a cycle period that is a function of the phase difference and is always greater than that corresponding to the then existing angle of phase variation from said relationship until said relationship is established, the said interruption being proportionally greater the smaller the angle of phase difference.

16. A method of bringing a plurality of isochronous motors operating on a common power source into a predetermined phase relationship, comprising periodically automatically interrupting the power circuit to at least one of said motors during a part of a cycle period that is a function of the phase difference and is always greater than that corresponding to the then existing angle of phase variation from said relationship until said relationship is established, the said interruption being proportionally greater the smaller the angle of phase difference.

DONALD L. HAY.